United States Patent [19]
Huntting

[11] Patent Number: 5,784,762
[45] Date of Patent: Jul. 28, 1998

[54] TRELLIS WIRES TIEING CLIPS USED WHEN CONTROLLING THE DIRECTION OF GROWTH AND THE SUPPORT OF PLANT FOLIAGE OF A CROP

[76] Inventor: Leonard M. Huntting, 394 Huntting Rd., Silver Creek, Wash. 98585

[21] Appl. No.: 786,860

[22] Filed: Jan. 22, 1997

[51] Int. Cl.$^6$ .............................. F16L 3/08; A44B 21/00
[52] U.S. Cl. .......................... 24/129 R; 47/44; 24/545; 24/543; 24/115 R; 256/54
[58] Field of Search .......................... 24/129 R, 115 R, 24/343, 370, 570, 543, 545, 495, 499; 47/44, 46; 256/47, 48, 54, 57

[56] References Cited

U.S. PATENT DOCUMENTS

| | | | |
|---|---|---|---|
| 3,963,855 | 6/1976 | Hawkins et al. | 47/44 X |
| 4,180,247 | 12/1979 | Pfarr, Jr. | 256/54 |
| 4,566,157 | 1/1986 | Packendorff | 24/545 X |
| 4,831,692 | 5/1989 | Chuan | 24/129 R X |
| 5,331,725 | 7/1994 | Chou | 24/545 |
| 5,429,289 | 7/1995 | Lamson et al. | 24/543 X |
| 5,542,209 | 8/1996 | Sheu | 47/44 |
| 5,555,607 | 9/1996 | Parveris | 24/129 R |

*Primary Examiner*—Randolph A. Reese
*Assistant Examiner*—Robert J. Sandy

*Attorney, Agent, or Firm*—Roy E. Mattern, Jr.

[57] ABSTRACT

Trellis wires tieing clips are used with pairs of spaced longitudinal trellis wires which are located to control the direction of growth and support of plant foliage of crops such as raspberries, blackberries, blueberries, and grapes. One wire is the longitudinal reference trellis wire, and the other wire is the longitudinal gathering trellis wire. Each trellis wires tieing clip is made of a molded plastic having: resiliency and a retention of shape memory, and having the integral portions of a transverse elongated top body portion; a transverse elongated trellis wire receiving volume in the top body portion; a centered bottom entry to guide trellis wires into the transverse elongated trellis wire receiving volume; a right side arm depending at a wire guiding angle from the transverse elongated top body portion; and a left side arm depending at a wire guiding angle from the transverse elongated top body portion. The right side of the transverse elongated trellis wire receiving volume restrictively and frictionally positions the longitudinal reference trellis wire, whereby the trellis wires tieing clips remain positioned at a selected location for an extended time until intentionally relocated. The left side of the transverse elongated trellis wire receiving volume freely and slidably positions a the longitudinal gathering trellis wire. The trellis wires tieing clips are of an overall size with their right and left arms depending sufficiently at wire guiding angles, that a person wearing gloves easily manipulates them.

14 Claims, 2 Drawing Sheets

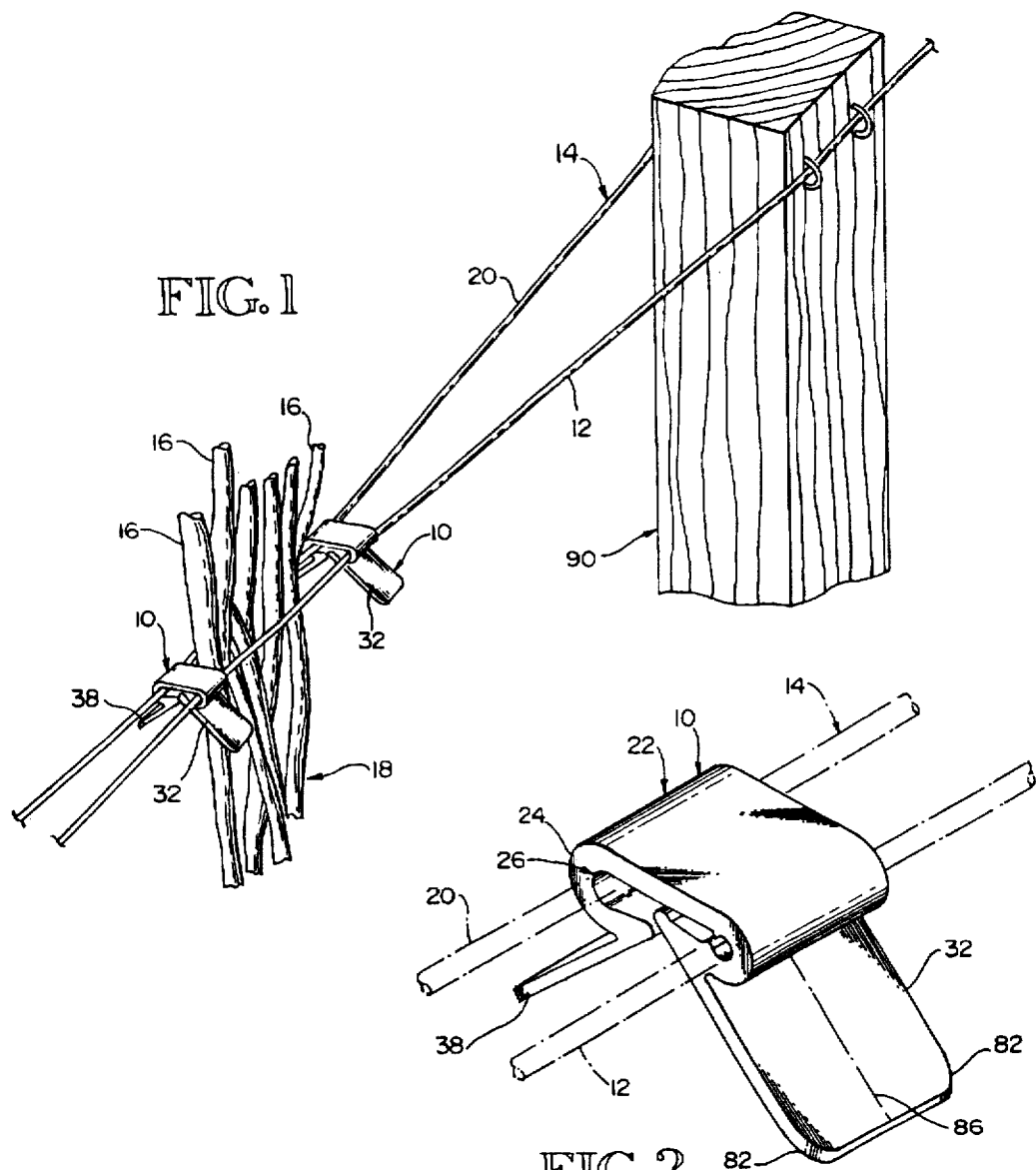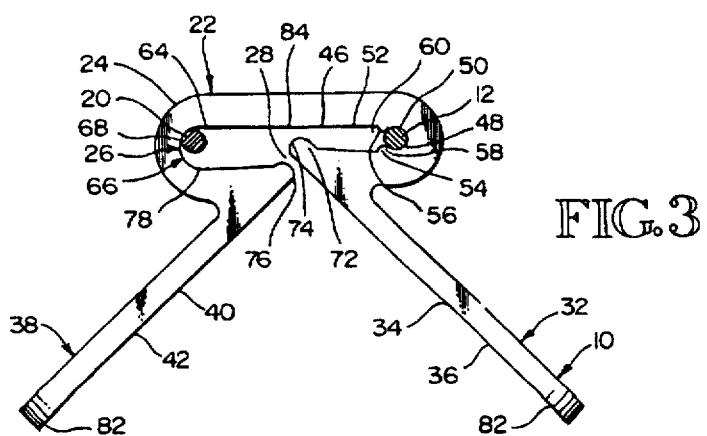

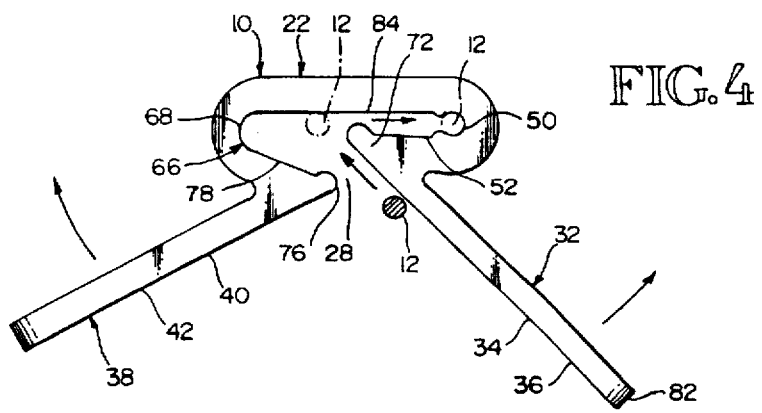
FIG. 4
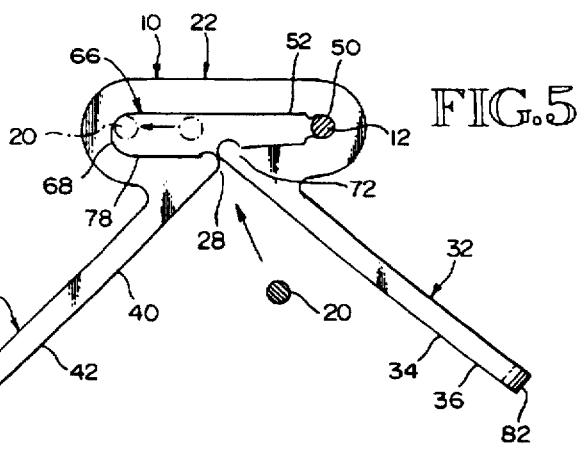
FIG. 5
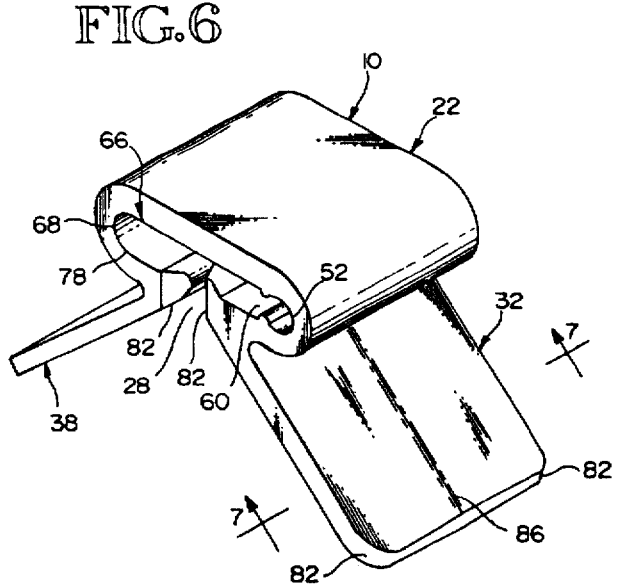
FIG. 6
FIG. 7

TRELLIS WIRES TIEING CLIPS USED WHEN CONTROLLING THE DIRECTION OF GROWTH AND THE SUPPORT OF PLANT FOLIAGE OF A CROP

REFERENCE TO PROVISIONAL PATENT APPLICATION

The Applicant, Leonard M. Huntting, filed his provisional patent application Ser. No. 60/010442 on Jan. 23, 1996 entitled Cane Berry Trellis Wire Tieing Clip.

BACKGROUND

In the cane berry industry and specifically the red raspberry industry, tieing of the fruiting canes to a trellis wire or wires is a necessary cultural practice. The trellis consists of end anchor posts in line with the row of berries with support posts of wood or steel fence posts spaced every 25 to 35; feet down the length of the row onto which support wires of usually number 12 or 12.5 gage wires are fastened. The trellis support wires are either clipped or stapled to the posts down the row and are anchored to the end posts, by sometimes using a tightening device to take up slack when end posts tip and loosen the trellis wires.

Several methods of placing the trellis wires are used. One method consists of using two wires, with one wire being located near the top of the posts and another wire being located half way between the top wire and the ground. Then the berry canes are either tied or woven or wrapped onto these two wires by various methods, techniques, and patterns.

Another system consists of two wires placed near the top of the posts with one wire being connected to the post and the other wire being free, except at the end anchor posts. This other wire is pulled out to place berry canes between the wires. Then the two wires are tied together with a string, or stapled together using a hog staple and stapler, at intervals of 12 to 18 inches to hold and secure the berry canes.

Another system incorporates either of the above systems with two additional wires located half way from the top of the trellis to the ground on opposite sides of the posts. The additional wires are supported by wire hooks located on the posts at their mid height. These two additional wires support the new canes as they grow in July and keep the new canes from falling down and hindering harvest.

The tieing method is varied from the use of a single tie of a hill or plant of canes usually 6 to 10 canes into a bundle onto a wire at a height conducive to the length and size of the canes in the specific field or area of the field. The canes are then topped or cut off at the desired height above the point at which they are tied to the trellis wire. Other methods used in hills of canes with larger numbers of canes is to tie half the canes into one place on the wire to the left of the center of the hill and the rest of the canes to a place to the right of the hill, and then topping the canes.

Other variations of this method use a two wire system where the canes are brought down to the second and lower wire and tied to it in an arch instead of topping them.

Another method of tieing canes to a trellis wire is to wrap or weave the canes onto the wire without the use of tieing strings. This method can also use a single or double wire system. On the single wire system the canes are wound from one hill to the next in a continual line of canes without topping. On a double wire wrapping weaving system the canes from a single hill are brought over the top wire and down to a lower wire and the tips of the canes are wrapped around the lower wire to secure them in place on the wire trellis.

Another method of supporting berry canes is to place canes between two wires near the top of the row posts, where each wire is located on an opposite side of each post, without an initial direct securement to a post. Then these two wires are either tied together with string or stapled to hold or trap canes in an upright position in alignment with the posts. The cane tops may be cut off, or arched back down into the trellis system as desired.

The wrapping or weaving of the canes has the advantage of being undertaken much faster than tieing with a string or stapling with hog staples. The disadvantage of wrapping or weaving is that canes are bundled too closely together and many buds will never grow because of crowding. Another disadvantage is the closely woven canes tend to encourage disease and insect infestation. These problems are also incurred with tieing of canes, which pulls canes into a tight bundle at the point of the tie.

This crowding effect is not such a problem with the two wires used to hold canes up between the wires with intermittent fasteners. However this method has disadvantages. One disadvantage is time required to tie or to staple. Also stapling with hog staples presents another problem of the possible contamination of fruit, when hog staples become dislodged and become a contaminant threat to the fruit.

Another problem with tieing of berry canes in any method used is the wear and tear on the tier's hands. Tieing is difficult with gloves on and hard on hands without gloves when tieing hundreds or thousands of ties. Berry canes are also thorny and hard to handle without gloves or with gloves with removed fingers to manipulate string for tieing. Problems also include packing of string bales and a cutting device when tieing and packing staplers and staples with stapling. Another problem is removal of strings or staples at the end of the fruiting cane life. String and staples can be broken but oftentimes they require cutting and other special attention.

With varying prices and crop growing conditions, the cost of labor which is directly related to time required to perform these required cultural tasks is most important. The ease of performance of any job also becomes important in finding the men and women who are willing to do many monotonous and/or difficult jobs.

SUMMARY

These trellis wires tieing clips made of plastic having resiliency and shape retaining memory, when used solve many of the problems previously existing in controlling the direction of growth and support of plant foliage of crops such as raspberries, blackberries, blueberries, grapes, and other similar growth crops. These growth crop industries utilize trellis wire arrangements to control the direction of growth and support of the plant foliage of the crops to facilitate their care, their growth, the growth of the crop, and the picking of the crop.

Longitudinally positioned wires extending between spaced wood and/or metal posts and positioned by them and secured to some of them, and subject to periodic tightening, serve in turn to support the foliage of crops such as controlling primo-canes and/or the fruiting canes as they grow. To enhance the support, for example, of the fruiting canes, the wires at selected spaced locations, while kept closely spaced, at the same elevation, are held in position by using this trellis wires tieing clip. These components with the inclusion of wire tensioning components, complete a respective trellis, generally arranged parallel to another trellis at a spaced distance to allow access to the plant foliage such as to the fruiting canes and subsequently to the fruit, such as raspberries.

After the plant foliage, such as primo-canes and/or fruiting canes, has grown sufficiently, the plant foliage is directed upwardly between the spaced wires, and groups of the plant foliage are arranged to be also confined between respective sets of these trellis wires tieing clips. The initial positioning of these clips is undertaken conveniently, with respect to one wire, hereinafter often referred to as the longitudinal reference trellis wire, or the reference wire. The clip positions are frictionally maintained along this reference wire.

Then after an arrangement of plant foliage such as in groups of primo-canes and/or fruiting canes is undertaken, and the groups have been extended upwardly through the spaced longitudinal reference and gathering trellis wires, each group is kept in a designated locale, by using the clips. Clips on the reference wire on each side of this group of primo-canes and/or fruiting canes are then also secured to the other spaced wire, hereinafter, often referred to as the longitudinal gathering trellis wire or gathering wire. These trellis wires tieing clips preferably remain as permanently as possible on the longitudinal reference trellis wires for the life of the clip and hopefully for the life of the crop field.

DRAWINGS OF THE PREFERRED EMBODIMENTS

The integral arrangement of the portions of this trellis wires tieing clip, and how these clips are conveniently handled, positioned, and manipulated by persons who are wearing fingered gloves, is described in reference to the drawings, wherein:

FIG. 1 is a perspective view of a portion of an overall trellis showing one post of several posts, which position at least two spaced wires, located at the same elevations, which in turn position groups of plant foliage such as primo-canes and/or fruiting canes kept in their respective spaced locales, between the spaced trellis wires tieing clips;

FIG. 2 is a perspective view of the trellis wires tieing clip, with dotted lines indicating the subsequent positioning of portions of the spaced longitudinal wires, referred to as the longitudinal reference and gathering trellis wires, or the reference and gathering wires;

FIG. 3 is an end view of the trellis wires tieing clip showing the cross section of respective positions of portions of the spaced longitudinal reference and gathering wires, when this clip has been fastened to these wires at a designated locale;

FIG. 4 is a cross sectional view, similar to FIG. 3, illustrating how the trellis wires tieing clip is first directionally manipulated, by a person wearing fingered gloves, when the clip is moved to contact, receive, and hold the reference wire of these two longitudinal spaced wires;

FIG. 5 is a cross sectional view similar to FIGS. 3 and 4, showing how the trellis wires tieing clip is at a second time, being directionally manipulated, by a person wearing fingered gloves, while the gathering wire of these two longitudinal spaced wires is being inserted in this clip, to complete the securement of this clip to hold these spaced wires closer to one another, at a predetermined distance across the inside of the clip, when both of these wires are in their positions in this clip;

FIG. 6 is a perspective view of a modified trellis wires tieing clip, indicating how all the corners thereof are diagonally formed to improve both the relative motion passage of the trellis wires, and the fingered glove handling of these clips; and FIG. 7 is a representative cross sectional view of either the right side arm or the left side arm of the trellis wires tieing clip, shown in FIG. 6, illustrating the distribution of the material used in the clip, either for strength improvement and/or insuring an excellent withdrawal of a molded clip from molds or dies.

DESCRIPTION OF THE PREFERRED EMBODIMENTS

The General Positioning and Utilization of the Trellis Wires Tieing Clips

The trellis wires tieing clip 10 illustrated throughout the figures of the drawings is initially reasonably, quickly, conveniently, and frictionally secured, in an essentially non rotating and non sliding position on a taut longitudinal reference trellis wire 12 of an overall trellis 14, by a person wearing gloves. This clip 10 then remains in whatever orientation the person leaves it, until the clip 10 is again used at a subsequent time when a gathering wire 20 is also to be positioned in respect to this clip 10. Whenever this clip 10 is to be subsequently rotated or slidably moved along a reference wire 12, a person using his or her gloved hand using minimal force will be able to change the clip's location and/or rotation in respect to the reference wire 12.

This clip 10 will remain in place on the reference wire 12 as long as possible. Whenever the clip 10 must be removed, it is intentionally and forcibly removed by a person wearing gloves.

As indicated in FIG. 1, other clips 10 are subsequently and sequentially secured in a like way at spaced locations along the same longitudinal reference trellis wire 12.

Subsequently, when plant foliage such as primo canes and/or fruiting canes 16, arranged in a plant or a hill group 18 of them, are being positioned into an upright orientation leaning against a reference trellis wire 12, this positioning is completed by also positioning this plant or hill group 18 between the reference trellis wire 12 and the gathering trellis wire 20. Then to keep the respective plant or hill groups 18 sufficiently separated in their vertical positions, the gathering trellis wire 20, at respective spaced locations, generally eighteen inches apart, is secured by using the previously positioned trellis wires tieing clips 10. As a result, each group 18 of a plant or a hill is supported in an area determined by the spaced, reference and gathering trellis wires 12, 20, located at the same elevation, and also by the spaced trellis wires tieing clips 10, holding the reference and gathering trellis wires 12, 20 in their closely spaced positions.

The Integral Overall Structure and Arrangement of the Overall Clip Body Which is the Trellis Wire Tieing Clip The trellis wire tieing clip 10 is an integral arrangement of an overall clip body 22 which, in its use position, has a horizontally orientated transverse elongated top body portion 24, which is adapted to extend in the horizontal direction of both a reference trellis wire 12 and a spaced gathering trellis wire 20. This top body portion 24 has a centrally located transverse elongated trellis wire receiving volume or opening 26, which has a centered bottom entry 28 adapted to frictionally and sequentially receive both a reference and a gathering trellis wire 12, 20, and thereafter to allow their positioning in this centrally located transverse elongated trellis wire receiving volume or opening 26.

This integral overall clip body 22 also has a depending right side arm 32 commencing at the centered bottom entry 28, and extending downwardly and outwardly into an angular position to serve both as a wire entering guide structure 34, and also to serve as a finger manipulating force receiving structure 36. Also this integral overall clip body 22 has a depending left side arm 38, likewise commencing at the centered bottom entry 28 of the transverse elongated opening 26, and extending downwardly and outwardly into an opposite angular position to serve both as a wire entering guide structure 40, and also to serve as a finger manipulating force receiving structure 42.

The Preferred Additional Integrally Formed and Shaped Portions of the Trellis Wires Tieing Clip Which Enable the Frictionally Held Positioning of This Clip About the Longitudinal Reference Trellis Wire, Which Keeps This Clip in Whatever Rotational Position a Person Places it on This Reference Trellis Wire, and Which Keeps This Clip From Sliding Along on This Longitudinal Reference Trellis Wire On a selected side, such as the right side 46, of the centrally located transverse elongated trellis wire receiving volume or opening 26, has the right terminus 48 thereof formed as a frictionally receiving curved opening 50 adapted to frictionally grip a reference trellis wire 12. Therefore, after the placement of this clip 10 on a reference trellis wire 12, this clip 20 will remain in whatever initial position a person places it, without tending to freely rotate about this wire 12, and without tending to slide along this longitudinal reference trellis wire 12.

Preferably, this right side 46, of the centrally located transverse elongated opening 26 has a reduced vertical height space portion 52 throughout the length of this right side 46 leading up to the frictionally receiving curved opening 50, which guides this wire 12 to this opening 50. Then preferably at the locale 54 between the frictionally receiving curved opening 50 and the reduced vertical height space portion 52, there are both an integral depending protrusion 56 above, and an integral upstanding protrusion 58 below, in this centrally located transverse elongated trellis wire receiving volume or opening 26, to create a restrictive entry 60 through which the reference trellis wire 12 is passed to thereafter be frictionally retained in the frictionally receiving curved opening 50.

Preferably, the left side 64, of the centrally located transverse elongated trellis wire receiving volume or opening 26 has an adequate clearance vertical height space portion 66 adapted to conveniently and quickly guide a gathering trellis wire 20 to the left side terminus 68 of this opening 26, where this wire 20 remains freely slidable relative to the clip 10, while being closely positioned next to the longitudinal reference trellis wire 12 by the trellis wires tieing clip 10.

Other Useful Refinements of the Cane Berry Trellis Wire Tieing Clip

To increase the positioning control of the longitudinal reference trellis wire 12, and also the longitudinal gathering wire 20, the right side arm 32 is preferably initially extended upwardly as shown throughout FIGS. 1 through 5 of the drawings. This extended portion 72 serves as a lower retaining abutment which requires that the longitudinal reference trellis wire 12 be relatively moved up, over, and down this extended portion 72 to reach the reduced vertical height space portion 52 of the transverse elongated opening 26 of the overall clip body 22, enroute to the frictionally receiving curved opening 50 located at the right terminus 48 of the transverse elongated trellis wire receiving volume 26.

During the utilization of the trellis wires tieing clip 10, this extended portion 72 serves to confine the longitudinal reference trellis wire 12, should this wire 12 ever be unintentionally moved out of the frictionally receiving curved opening 50, which is supplemented in retaining this wire 12 by the depending protrusion 56 and the upstanding protrusion 58.

Preferably, the top 74 of this extended portion 72 is rounded to enhance the relative motion passage of the longitudinal reference trellis wire 12 during its positioning in this trellis wires tieing clip 10. Likewise the top 76 of the left side arm 38, which remains at the level of the bottom 78 of the adequate clearance vertical height space portion 66 of the left side 64 of transverse elongated trellis wire receiving volume 26, is also rounded to enhance the relative motion of both the longitudinal reference and gathering trellis wires 12, 20, as they are entered or withdrawn through the centered bottom entry 28 of the trellis wires tieing clip 10. The reference wire 12 is seldom removed, generally only being intentionally removed, if a crop field is to be converted to another crop, and the wires and clips are to be taken to another field, or if a clip 10 becomes damaged.

The extended portion 72 of the right side arm 32 also serves to keep the gathering trellis wire 20 in the adequate clearance vertical height space portion 66, after it has been relatively moved up through the centered bottom entry 28. Also at the same time, the extended portion 72 of the right side arm 32 serves to prevent the unwanted entry of the longitudinal gathering trellis wire 20 into the reduced vertical height space portion 52 of the right side 46 of the transverse elongated volume or opening 26 of the this trellis wires tieing clip 10. The adequate clearance vertical height space portion 66 on the left side which has a greater clearance than the right side, is intentionally provided so the gathering wire 20 can be easily removed from the clip 10. When this wire 20 is to be removed, the left side arm 38 is lifted, and the gathering wire 20 will naturally, by the force of gravity, slide along the bottom 78 of the adequate clearance vertical height space 66, to reach the centered bottom entry 28, and to pass down and out through this bottom entry 28. This removal process of the gathering wire 20 from the trellis wires tieing clip 10, is enhanced, as a person using his or her gloved hands, pulls the gathering wire 20 downwardly and outwardly, while, at the same time, lifting the left side arm 38 of this clip 10.

As illustrated in FIGS. 6 and 7, both the right side arm 32 and the left side arm 38 have all their respective corners, all referred to by the numeral 82, formed on a diagonal, both to enhance the convenience of the relative motion passage of the reference and gathering trellis wires 12, 20, and to improve the comfort of their fingered glove handling.

Selection of Materials Used, and the Various Design Considerations Pertaining to Providing Excellent Trellis Wires Tieing Clips Preferably, this trellis wires tieing clip 10 is manufactured by using methods and machines for the injection molding of plastic. Preferably, the plastic will be polypropylene. Preferably the color will be blue, and during the manufacture an ultraviolet light stabilizer substance will be added. Such a stabilizer is used for it is intended that these trellis wires tieing clips 10 will be frictionally retained in position on the longitudinal reference trellis wire 12, for a long time, as long as they are needed.

The polypropylene plastic is used because of its strength and its flexibility based on its sufficient elasticity and its retention of shape memory. As noted in reviewing the FIGS. 1 through 5 of the drawings, when the trellis wires tieing clip 10, is ready to be installed, and also after it has been installed, both the centered bottom entry 28 of the transverse elongated volume or opening 26, and the entry 84, located at the top 76 of the left side arm 38, through which the reference trellis wire 12 must pass, when entering or leaving the reduced vertical height space portion 52 of the right side 46 of the transverse elongated trellis wire receiving volume or opening 26, are each too limited in clearance for the free unobstructive relative motion passage of the respective reference or gathering trellis wires 12, 20. The clip 10 therefore must be manipulated by a person using his or her gloved hands in order to move a respective wire through a respective entry 28 or entry 84.

Therefore, by using polypropylene plastic, or a material of like or near similar properties, the person who installs and utilizes the trellis wires tieing clips 10, is able to bend, deflect, and/or twist the overall clip body 22, especially the right side arm 32 and the left side arm 38 thereof, to temporarily enlarge the clearances of these respective entries 28, 84, for the relative motion passage of the respective longitudinal reference and gathering trellis wires 12, 20. Such manipulations of the trellis wires tieing clips 10 is conveniently and quickly undertaken by a person who is wearing fingered gloves, that protect and comfort her or his fingers and hands.

As noted in FIGS. 6 and 7, the thickness of the plastic material is greater in some locations, such as along the centerline 86, of an arm, because of either the need for the greater thickness to insure the strength, and/or to create a so called draft configuration required for the removal of formed plastic materials from the forming molds or dies. The thickness of the material wherever used in the clip 10 is a function of the kind of plastic used, and the plastic's strength and flexibility to perform the desired functions of this clip 10. Whenever and wherever possible the thickness is kept as minimal as possible to obtain the flexibility needed during the convenient and relatively quick installation of the trellis wires tieing clip 10 on the longitudinal reference trellis wire 12, and the subsequent convenient and quick retention of the longitudinal gathering trellis wire 20 of the overall trellis 14, which includes the wood and/or metal posts 90, as illustrated in FIG. 1.

Other Resulting Cross Sectional Shapes and Other Changes Sometimes Necessitated by Utilizing Different Plastic Injection Molding Machines Cross sections other than as illustrated in FIG. 7 result when different plastic injection molding machines are used. In respect to another resulting cross section, the B gate side of the mold does not have any draft and is 3/23 inch or 0.093 inch thick to the center line where it is cambered to meet the A gate half of the mold which is 1/8 inch or 0.125 inch thick in the center and is drafted to 3/32 inch thick at the outer edge. At the center line of the clip and where the two halves of the mold meet, the difference in thickness is the difference between 1/8 inch and 3/32 inch. There is a camber here to make a smooth transition in thickness and a cleaner look to the center line of the clip. The reason for this configuration is to facilitate injection molding and give the proper strength and flexibility to the clip. The drafted side of the clip is the A gate side of the mold and the hot side. It needs to pull away from the B gate side of the mold and leave the clip in the B gate side of the mold, where pins will push the clip from the B gate as part of the injection process. The draft configuration or lack of draft on the respective sides of the mold are such to facilitate this process.

Also the draft of or on the A gate side of the mold creates a shape on the outside surface of the clip only, and only across and around the top transverse portions of the clip around to the right side arm 32 and the left side arm 38. The remainder of the clip's cross section has a 2 degree draft radius, to facilitate clip removal from the mold. This 2 degree draft radius is equally distributed on the inside and outside surfaces of the clip, except in or on the inside surface of space 50 which holds wire 12. Here the draft is eliminated to give a consistent size space 50 from the B gate side of the mold through the A gate side of the mold.

Thus the wire gripping pressure across the entire width of the space 50 of the clip is equal, except on the outside edges of the clip, which are rounded away from the wire. This rounded edge is consistent throughout all outside edges of the clip. These technical aspects of this way of molding the clip are more a function of the injection molding process than the clip, but they are necessarily incorporated to serve both the function of injection molding and the function of this trellis wires tieing clip 10.

A List of Some of the Key Functions That are Realized When These Trellis Wires Tieing Clips Are Utilized When these trellis wires tieing clips are utilized, these key functions are realized:

1. The clip is of a size that makes it easy to handle and manipulate while wearing gloves.
2. The clip is of a color that makes it easily distinguished from most crop or plant colors and field colors.
3. The clip is nicely rounded to the touch and easy on bare hands or gloved hands, which is essential because they will be handled by the thousands per day and they will not excessively wear gloves or even bare hands with sharp edges.
4. The clip is designed so that if the clip becomes dislodged from the gripping area of the clip from the wire that permanently holds the clip, the clip will still be trapped and dangle on the wire, not being lost onto the ground.
5. The clip is designed to accept the clip holding wire in such a fashion that alignment for insertion onto the wire of the clip is quick and easy and insertion and securing of the second wire can be done in an instant.
6. Removal of the second wire as desired can be done quickly without fuss or special attention because of the unique design of the clip concerning how it holds the second wire in a larger area that opens below the wire gripping side of the clip and below the point where the first wire enters into the side of the clip that permanently holds the clip.
7. The clip grips the wire which permanently holds the clip with just sufficient grip to hold the clip securely yet allow some alternation of its position longitudinally on the wire if so desired from year to year, and the clip rotates on the wire so as to allow easy insertion of the second wire yet not allow the clips to slide freely on the wire and become bunched together on the wire.
8. The flexibility of the clip and the plastic used is such to give a proper strength to properly hold the trellis wires as desired yet give flexibility to the clip to easily release the wire when desired or insert the wire or wires when desired, and yet not unduly fail, such as break or distort, under unintentional stress loads caused by machinery veering off rows or under other unintentional stress loads.

Possible Other Materials and/or Manufacturing Methods

In respect to plastic materials, currently injection molding of plastic is being utilized. The extrusion of plastic is being considered.

It is possible that other materials could be used to meet the functions of these trellis wires tieing clips.

I claim:

1. A trellis wires tieing clip, to be used with other like spaced trellis wires tieing clips to keep parallel side by side trellis wires spaced apart at a preselected minimum distance, with each tieing trellis wires clip being essentially permanently positioned until intentionally removed, first at a selected location on one of the trellis wires, designated as the longitudinal reference trellis wire, where this clip will so remain for a long time, and subsequently when plant foliage is gathered and directed between the trellis wires, the trellis wires tieing clip is also then more conveniently and more removably positioned on the other one of the trellis wires, designated as the longitudinal gathering trellis wire, until the trellis wires are to be separated again to remove the plant foliage, comprising an overall tieing clip body having the integral portions of:

a. a transverse elongated top body portion;

b. a transverse elongated trellis wires receiving volume in the top body portion having a right side and a left side, with the right side being of a smaller volume with a variable depth always being of less depth than the large volume of the left side;

c. a restricted centered bottom entry, when intentionally opened wider, to guide trellis wires one at a time into the transverse elongated trellis wire receiving volume and having a right side and a left side, with the right side extending up into the trellis wires receiving volume, and the left side stopping at the bottom of the trellis wires receiving volume;

d. a right side arm substantially depending at a wire guiding angle of substantially forty five degrees outwardly from the transverse elongated top body portion commencing at the right side of the centered bottom entry, to also serve to receive finger applied forces to open the restricted bottom entry; and e. a left side arm substantially depending at a wire guiding angle of substantially forty five degrees outwardly from the transverse elongated top body portion commencing at the left side of the centered bottom entry to also serve to receive finger applied forces to open the restrictive bottom entry, and the included entry angle between the depending right side arm and the depending left side arm is substantially ninety degrees.

2. A trellis wires tieing clip, as claimed in claim 1, wherein the right side, of smaller volume and of less variable depth, of the transverse elongated trellis wires receiving volume has a restrictive vertical height entry to be intentionally increased in size by finger applied forces, to controllably guide the longitudinal reference trellis wire into an installed essentially permanent position in the right side of the smaller volume and of less variable depth.

3. A trellis wires tieing clip, as claimed in claim 2, wherein the left side of larger volume of the transverse elongated wire receiving volume has a less restrictive vertical height entry to be intentionally increased in size by finger applied forces to more readily and controllably guide the longitudinal gathering trellis wire into an installed position, in the left side of the larger volume and of greater depth.

4. A trellis wires tieing clip, as claimed in claim 3, wherein the right side of the restricted centered bottom entry, in extending upwardly and partially into the transverse elongated trellis wires receiving volume also serves as a retaining abutment to retain the longitudinal reference trellis wire in the smaller volume of less variable depth right side of the transverse elongated trellis wires receiving volume.

5. A trellis wires tieing clip, as claimed in claim 4, wherein the right side, of smaller volume and variable depth, of the transverse elongated trellis wires receiving volume, near and at the right terminus thereof, is formed to have a circular cross section volume having a restrictive entry to receive and to position a portion of the longitudinal reference trellis wire to frictionally keep the trellis wires tieing clip in the initially selected position thereof along the longitudinal reference trellis wire.

6. A trellis wires tieing clip, as claimed in claim 5, wherein both the right and left side arms depending at their respective wire guiding angles extend sufficiently to provide both a wide convenient entry to guide respectively both the longitudinal reference trellis wire and the longitudinal gathering trellis wire to the restricted centered bottom entry, and to conveniently receive glove covered finger forces used to open the restricted centered bottom entry, while positioning the trellis wires tieing clip.

7. A trellis wires tieing clip, as claimed in claim 6, wherein the material is resilient enough to be manipulated upon application of finger forces and has a retention of an original shape memory, when finger forces are removed;

whereby both the right and left depending side arms receive finger applied forces to temporarily move them farther apart to increase the clearance of the otherwise restricted centered bottom entry during the respective entries of both the longitudinal reference trellis wire and the longitudinal gathering trellis wire.

8. A trellis wires tieing clip, as claimed in claim 7, wherein the material is resilient enough to be manipulated upon application of finger forces and has a retention of an original shape memory, when finger forces are removed;

whereby the restrictive entry of the circular cross section volume becomes less restrictive, opening up sufficiently when the longitudinal reference trellis wire is passed through this restrictive entry and into the circular cross section volume, where the longitudinal reference trellis wire is frictionally held in place.

9. A trellis wires tieing clip, as claimed in claim 8, wherein the material is resilient enough to be manipulated upon application of finger forces and has a retention of an original shape memory;

whereby the retaining abutment of the right side of the restricted centered bottom entry is lowered when the longitudinal reference trellis wire is passed over the retaining abutment and into the right side of smaller volume and of less variable depth of the transverse elongated trellis wires receiving volume.

10. A trellis wires tieing clip, as claimed in claim 9, wherein the material used in making the trellis wires tieing clip, when shaped, has minimal exposed portions which could possibly cause injury to persons handling the trellis wires clip.

11. A trellis wires tieing clip, as claimed in claim 10, wherein the overall size of trellis wires tieing clip is large enough to be conveniently manipulated by a person using his or her fingers.

12. A trellis wires tieing clip, as claimed in claim 11, wherein the overall size of the trellis wires tieing clip is large enough to be conveniently manipulated by a person wearing fingered gloves.

13. A trellis wires tieing clip, as claimed in claim 2, wherein the material used in making the trellis wires tieing clip is colored blue, whereby the location of the trellis wires tieing clip is easily found, as the blue color of the trellis wires tieing clip is distinguishable from respective colors of crops, foliage, plants, and other field arranged items.

14. A trellis wires tieing clip, as claimed in claim 12, wherein the right and left sides of the restricted bottom entry, at the respective tops thereof, are contoured, such as rounded or beveled, to facilitate the ease of respective wire insertions.

* * * * *